(12) United States Patent
Wu et al.

(10) Patent No.: US 11,467,318 B2
(45) Date of Patent: Oct. 11, 2022

(54) INVERSION PROCESSING OF WELL LOG DATA

(71) Applicant: Halliburton Energy Services, Inc., Houston, TX (US)

(72) Inventors: Hsu-Hsiang Wu, Sugar Land, TX (US); Glenn Andrew Wilson, Houston, TX (US); Rencheng Song, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 630 days.

(21) Appl. No.: 15/779,828

(22) PCT Filed: May 8, 2017

(86) PCT No.: PCT/US2017/031578
§ 371 (c)(1),
(2) Date: May 29, 2018

(87) PCT Pub. No.: WO2018/208280
PCT Pub. Date: Nov. 15, 2018

(65) Prior Publication Data
US 2020/0264334 A1 Aug. 20, 2020

(51) Int. Cl.
*G01V 99/00* (2009.01)
*E21B 49/00* (2006.01)
(Continued)

(52) U.S. Cl.
CPC .......... *G01V 99/005* (2013.01); *E21B 47/022* (2013.01); *E21B 49/00* (2013.01);
(Continued)

(58) Field of Classification Search
CPC .......... G01V 99/005; G01V 1/50; G01V 3/18; G01V 3/38; G01V 1/48; G01V 2210/62;
(Continued)

(56) References Cited

U.S. PATENT DOCUMENTS

| 5,858,790 | A | * | 1/1999 | Kim | ................... G01N 33/5002 436/16 |
| 6,594,584 | B1 | * | 7/2003 | Omeragic | ............... G01V 3/28 702/9 |
| 10,386,536 | B2 | * | 8/2019 | Hartmann | ............ G01V 11/005 |
| 10,648,316 | B2 |   | 5/2020 | Wilson et al. | |

(Continued)

FOREIGN PATENT DOCUMENTS

| CA | 2923007 A1 | 4/2015 |
| WO | 2009076183 A2 | 6/2009 |

(Continued)

OTHER PUBLICATIONS

International Search Report and Written Opinion dated Feb. 6, 2018; International PCT Application No. PCT/US2017/031578.

*Primary Examiner* — John E Johansen
(74) *Attorney, Agent, or Firm* — McGuireWoods LLP (57) ABSTRACT

The disclosed embodiments include devices and methods to perform inversion processing of well log data. In one embodiment, a method to perform inversion processing of well log data includes obtaining an initial model of an earth formation based on a plurality of modeling parameters that includes formation parameters of the earth formation and calibration factors associated with orientations of antennas of a logging tool utilized to measure raw measurements of the earth formation. The method also includes performing a forward modeling of the modeling parameters to obtain a modeling response, and performing a joint cost function of the first modeling response and raw measurements obtained by the logging tool. The method further includes readjusting the initial model if a result of the joint cost function is not below a threshold, and providing the modeling response if the result of the joint cost function is below the threshold.

20 Claims, 4 Drawing Sheets

(51) Int. Cl.
*G01V 3/18* (2006.01)
*G01V 3/38* (2006.01)
*G01V 1/50* (2006.01)
*E21B 47/022* (2012.01)
*G01V 1/48* (2006.01)
*E21B 7/06* (2006.01)
*E21B 41/00* (2006.01)

(52) U.S. Cl.
CPC .............. *G01V 1/50* (2013.01); *G01V 3/18* (2013.01); *G01V 3/38* (2013.01); *E21B 7/06* (2013.01); *E21B 41/00* (2013.01); *E21B 2200/20* (2020.05); *G01V 1/48* (2013.01); *G01V 2210/62* (2013.01)

(58) Field of Classification Search
CPC .... E21B 47/022; E21B 49/00; E21B 2200/20; E21B 7/06; E21B 41/00
USPC ............................................................ 703/10
See application file for complete search history.

(56) References Cited

U.S. PATENT DOCUMENTS

| | | | |
|---|---|---|---|
| 2009/0198476 A1 | 8/2009 | Kim et al. | |
| 2012/0217968 A1 | 8/2012 | Seydoux et al. | |
| 2015/0276972 A1 | 10/2015 | Frey | |
| 2015/0330190 A1 | 11/2015 | Wu et al. | |
| 2016/0003963 A1 | 1/2016 | Kouchmeshky et al. | |
| 2017/0075021 A1* | 3/2017 | Thiel | G01V 3/38 |
| 2017/0321545 A1 | 11/2017 | Wilson et al. | |
| 2018/0299577 A1* | 10/2018 | Wu | G01V 3/38 |
| 2018/0348395 A1 | 12/2018 | Wilson et al. | |
| 2019/0064383 A1 | 2/2019 | Song et al. | |
| 2020/0096663 A1* | 3/2020 | Shetty | G01V 3/18 |

FOREIGN PATENT DOCUMENTS

| | | | | |
|---|---|---|---|---|
| WO | 2014003701 A1 | 1/2014 | | |
| WO | 2014003757 | 1/2014 | | |
| WO | 2014098919 | 6/2014 | | |
| WO | WO-2014098919 A1 * | 6/2014 | ............... | G01V 3/26 |
| WO | 2015137921 A1 | 9/2015 | | |
| WO | 2016123014 A1 | 8/2016 | | |

* cited by examiner

INVERSION PROCESSING OF WELL LOG DATA

BACKGROUND

The present disclosure relates generally to inversion processing of well log data. Directional drilling is a practice to drill a wellbore in a non-vertical direction. Directional drilling techniques for forming a wellbore often include vertically drilling from a surface location to a desired subterranean depth (kickoff point), from which point, drilling is curved to connect the wellbore to one or more hydrocarbon reservoirs. Directional drilling provides access to hydrocarbon reservoirs where vertical access is difficult, costly, and/or is hazardous. Directional drilling also provides additional exposure to reservoirs over vertical drilling by drilling through the reservoirs at an angle. Further, multiple boreholes may be drilled in various directions from the kickoff point, thereby connecting a single wellhead to multiple hydrocarbon reservoirs located thousands of feet from the wellhead, and drastically reducing the surface real estate of a well site. However, directional drilling is also more technologically sophisticated than vertical drilling. More particularly, accurate and detailed information regarding the earth formation is imperative to steer drill bits away from water zones and other undesirable zones, and toward the hydrocarbon reservoirs.

Logging tools, such as resistivity tools, nuclear tools, seismic tools, acoustic tools, as well as other types of tools are often deployed in a bottom-hole assembly to determine formation properties proximate the bottom-hole assembly. More particularly, transmitter antennas and receiver antennas of said tools are often deployed along different subs of the bottom-hole assembly to augment deep reading capability. A forward modeling of the formation properties and/or a modeling response may be generated based on the formation properties and utilized to determine a desired path to the hydrocarbon reservoirs.

Directional drilling may cause the transmitter antennas and receiver antennas, which are deployed on different subs, to orient themselves at different angles relative to each other. As such, the orientations of the transmitter antennas relative to the receiver antennas often change during directional drilling. Further, the spatial distance between transmitter antennas and the receiver antennas may also vary. The orientations of the transmitter antennas relative to the receiver antennas as well as the spatial distance between said antennas should be determined in order to accurately determine the formation properties and to accurately generate the forward modeling and the modeling response.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems, devices, and methods to perform inversion processing of well log data. More particularly, the present disclosure relates to systems, devices, and methods to perform inversion processing of well log data to obtain accurate earth formation models. A logging tool, such as a resistivity tool, a nuclear tool, a seismic tool, an acoustic tool, or another tool operable to measure signals (raw measurements) of an earth formation proximate the logging tool may be deployed on multiple subs of a bottom-hole assembly formed from multiple collars (subs) that are coupled to each other, on a wireline, or by other methods described herein. Multiple modeling parameters are utilized to generate a model of the earth formation that conforms to the raw measurements. The modeling parameters include formation parameters, calibration factors, as well as other input parameters that are utilized to generate the model of the earth formation. Examples of the formation parameters include the horizontal resistivity of the earth formation, the vertical resistivity of the earth formation, the thickness of a layer of the earth formation, as well as other parameters of the earth formation. Examples of additional modeling parameters include a distance to a boundary of the formation proximate to the logging tool and/or the bottom-hole assembly, distance to a subterranean reservoir, as well as other parameters described herein.

In some embodiments, the logging tool includes transmitter and receiver antennas that are deployed on different subs of the bottom-hole assembly. As the logging tool is deployed in a non-vertical wellbore, the orientations of the transmitter and receiver antennas of the logging tool are not always aligned and are calibrated (calibration factors) in order to accurately generate models of the earth formation that conforms to the measurements made by the logging tool. As defined herein, the calibration factors include various factors that are utilized to calibrate the logging tool. Examples of the calibration factors include an absolute orientation of the transmitter antenna, an absolute orientation of the receiver antenna, a relative orientation of the transmitter antenna with respect to the receiver antenna and vice versa, an relative orientation of a sub the transmitter antenna is deployed on relative to a sub the receiver antenna is deployed on and vice versa, distance between the transmitter antenna and the receiver antenna, other indications of the orientations of the transmitter antenna and/or the receiver antenna, or other instruments of the logging tool. As defined herein, the absolute orientation of an antenna or a sub defines an orientation of the antenna or the sub with respect to a component or an axis that stays approximately constant when deployed in non-vertical wellbores. For example, the absolute orientation of the receiver antenna of the logging tool with respect to the vertical orientation of a sub the receiver antenna of the logging tool is deployed on remains approximately constant. Further, the relative orientation of an antenna with respect to another antenna or a sub relative to another sub defines an orientation that varies when deployed in non-vertical wellbores. The relative orientations of the subs or the relative orientations of the antennas may be an azimuth angle between the subs or the antennas, an angle of inclination between the subs or between the antennas, or another quantifiable angle between the subs or between the antennas. In some embodiments, tools operable to measure and/or determine calibration factors described herein (collectively hereafter referred to as orientation measurement tools) are also deployed on the subs. Examples of orientation measurement tools include magnetometers, inclinometers, accelerometers, as well as other tools that are operable to measure the absolute and/or relative orientations of two subs and/or two antennas.

An initial model of the earth formation is generated based on the modeling parameters described in the foregoing paragraphs. A first forward modeling of the modeling parameters is then performed to obtain a first modeling response of the first forward modeling. A joint cost function of the modeling response and the raw measurements obtained by the logging tool is performed to assess the accuracy of the first modeling response. Moreover, if the result of the joint cost function is below a predetermined threshold, then the initial model of the earth formation is determined to be an accurate model. Alternatively, the initial model is readjusted if the result is not below the predetermine threshold. In some embodiments, readjusting the initial model includes adjusting at least one of the calibration factors described herein. For example, if the orientation measuring tool determines that an azimuth angle between the transmitter and receiver antenna is 10 degrees, the azimuth angle may be readjusted to 11 degrees, and an adjusted model of the earth formation is obtained. A second forward modeling of the readjusted azimuth angle as well as other formation parameters is also performed to obtain an adjusted modeling response. A joint cost function of the adjusted model response and the raw measurements is then performed and the result of the joint cost function is compared with the predetermined threshold to determine the accuracy the adjusted model. The foregoing process is repeated and the earth formation model is continuously adjusted until the result of the joint cost function falls below the predetermined threshold.

In some embodiments, a subcomponent of the bottom-hole assembly is operable to perform the foregoing operations to obtain the initial model and one or more adjusted models, perform one or more forward modelings of the modeling parameters to obtain modeling responses, perform one or more joint cost functions to improve the accuracy of the earth formation model, and transmit data indicative of the initial model, the forward modelings, the modeling response, the results of one or more joint cost functions, as well as other calculations to a surface based device via a telemetry network. In other embodiments, the foregoing operations are performed by a surface based device that is operable to provide results of the foregoing operations to an operator. Additional descriptions of the foregoing system, device, and method to perform inversion processing of well log data are described in the paragraphs below and are illustrated in at least FIGS. 1-4.

Figure 1A:
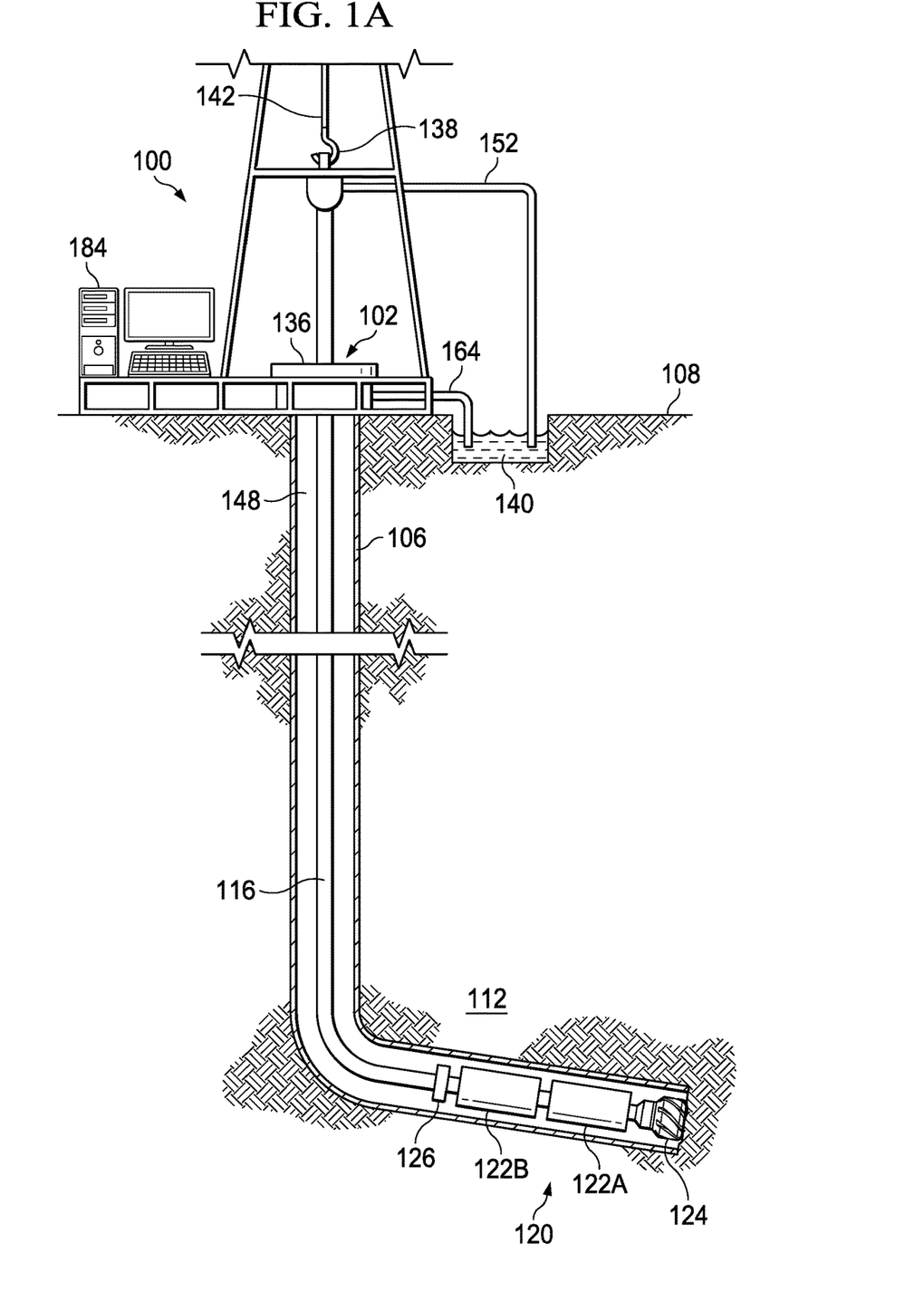
FIG. 1A is a schematic, side view of a logging while drilling (LWD)/measurement while drilling (MWD) environment with a bottom-hole assembly having drill bits and multiple subs, and being deployed to engage in directional drilling.

Turning now to the figures, FIG. 1A is a schematic, side view of a LWD environment 100 with a bottom-hole assembly 120 having a drill bit 124 and two subs 122A and 122B, where the bottom-hole assembly 120 is deployed in a wellbore 106 to engage in directional drilling. FIG. 1A may also represent a MWD environment or another completion or preparation environment where non-vertical drilling is performed. In the embodiment of FIG. 1A, a well 102 having a wellbore 106 extends from a surface 108 of the well 102 to or through a subterranean formation 112. A hook 138, cable 142, traveling block (not shown), and hoist (not shown) are provided to lower a conveyance 116 down the wellbore 106 or to lift the conveyance 116 up from the wellbore 106. In some embodiments, the conveyance 116 may be wireline, slickline, coiled tubing, drill pipe, production tubing, downhole tractor or another type of conveyance operable to deploy the bottom-hole assembly 120.

At wellhead 136, an inlet conduit 152 is coupled to a fluid source (not shown) to provide fluids, such as drilling fluids, downhole. The conveyance 116 has an internal cavity that provides a fluid flow path from the surface 108 down to the bottom-hole assembly 120. In some embodiments, the fluids travel down the conveyance 116, through the bottom-hole assembly 120, and exit the conveyance 116 at the drill bit 124. The fluids flow back towards the surface 108 through a wellbore annulus 148 and exit the wellbore annulus 148 via an outlet conduit 164 where the fluids are captured in a container 140.

The bottom-hole assembly 120 includes a first sub 122A and a second sub 122B that is adjacent to the first sub 122A. A transmitter antenna and a receiver antenna of a logging tool are deployed on the first and second subs 122A and 122B, respectively. For example, the logging tool is a resistivity logging tool and a transmitter antenna of the resistivity tool and the receiver antenna of the resistivity tool are deployed in the first and second subs 122A and 122B, respectively. Signals transmitted from the transmitter antenna travel through the formation 112, and are received by the receiver antenna. In some embodiments, orientation measurement tools are also deployed on the first sub 122A and the second sub 122B to determine the absolute orientations of the first sub 122A and the second sub 122B, the relative orientation of the first sub 122A with respect to the second sub, 122B, the relative orientation of the transmitter antenna with respect to the receiver antenna, as well as other calibration factors described herein. Although the transmitter and receiver antennas of the embodiment illustrated in FIG. 1A are deployed in adjacent subs, in other embodiments, the said antennas are deployed in non-adjacent subs (not shown) of the down-hole assembly 120. Similarly, orientation measurement tools are also deployed on non-adjacent subs to determine the orientations of said antennas with respect to each other. Additional descriptions of logging tool and orientation measurement tools and their operations are described in more detail in the following paragraphs and are illustrated in at least FIGS. 2A and 2B. Data indicative of measurements made by the logging tool and the orientation measurement tools are provided to device 126.

The device 126 includes any electronic device or component thereof that is operable to generate earth formation models based on measurements made by the logging tool and the orientation measurement tools, and to execute operations described herein to perform inversion processing of the formation models to obtain modeling responses that match the raw measurements. In some embodiments, the device 126 is a component of the bottom-hole assembly 120. In one of such embodiments, the device 126 is communicatively connected to controller 184 via a telemetry system (not shown) and is operable to provide modeling responses that match the raw measurements to the controller 184. An operator may then access the controller 184 to analyze the modeling responses. In other embodiments, the device 126 is a component of a downhole tool that is deployed at a downhole location proximate to the bottom-hole assembly 120 and is operable to provide modeling responses to the controller 184 via the telemetry system. In further embodiments, the device 126 is a component of the controller 184, and is operable to receive the raw measurements and the orientation measurements via the telemetry system and perform operations described herein to perform inversion processing of well log data.

Figure 1B:
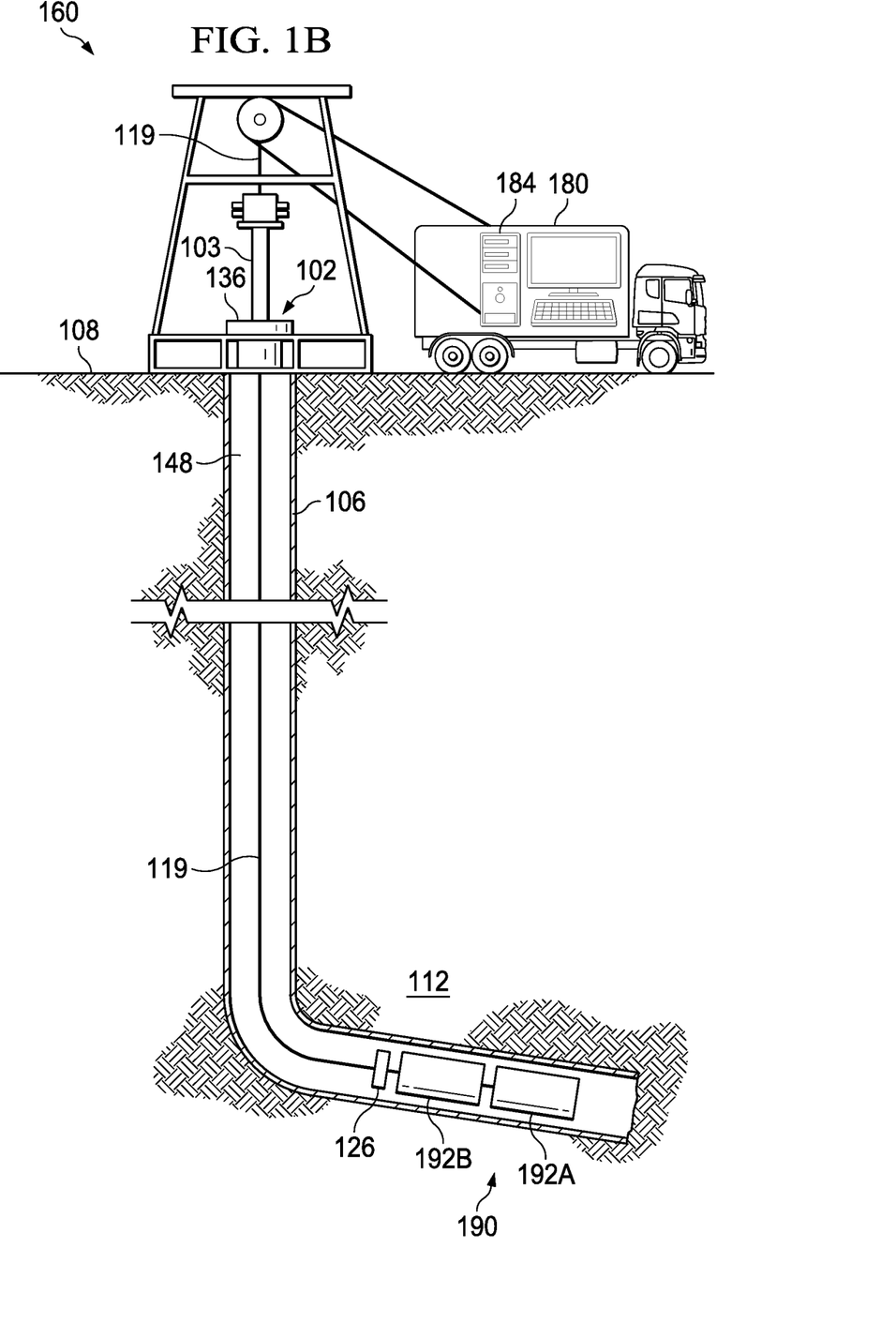
FIG. 1B is a schematic, side view of a wireline embodiment with antennas deployed on two components of a wireline logging tool.

FIG. 1B illustrates a side view of a wireline embodiment 160 with antennas deployed on two components 192A and 192B of a wireline logging tool 190. In the embodiment of FIG. 1B, a vehicle 180 carrying a wireline 119 is positioned proximate the well 102. The wireline 119 along with the logging tool 190 are lowered through the blowout preventer 103 into the well 102. In the embodiment of FIG. 1B, a transmitter antenna and a receiver antenna of the logging tool 190 are deployed on a first component 192A and a second component 192B of the logging tool 190. Signals transmitted from the transmitter antenna travel through the formation 112, and are received by the receiver antenna. In some embodiments, orientation measurement tools are also deployed on the first component 192A and the second component 192B of the logging tool 190 to determine the absolute orientations of the first component 192A and the second component 192B of the logging tool 190, the relative orientation of the first component 192A of the logging tool 190 with respect to the second component 192B of the logging tool, the relative orientation of the transmitter antenna with respect to the receiver antenna, as well as other calibration factors described herein. Data indicative of measurements made by the logging tool and the orientation measurement tools are provided to the device 126 or to the controller 184 via the wireline 119 or another telemetry system.

Figure 2A:
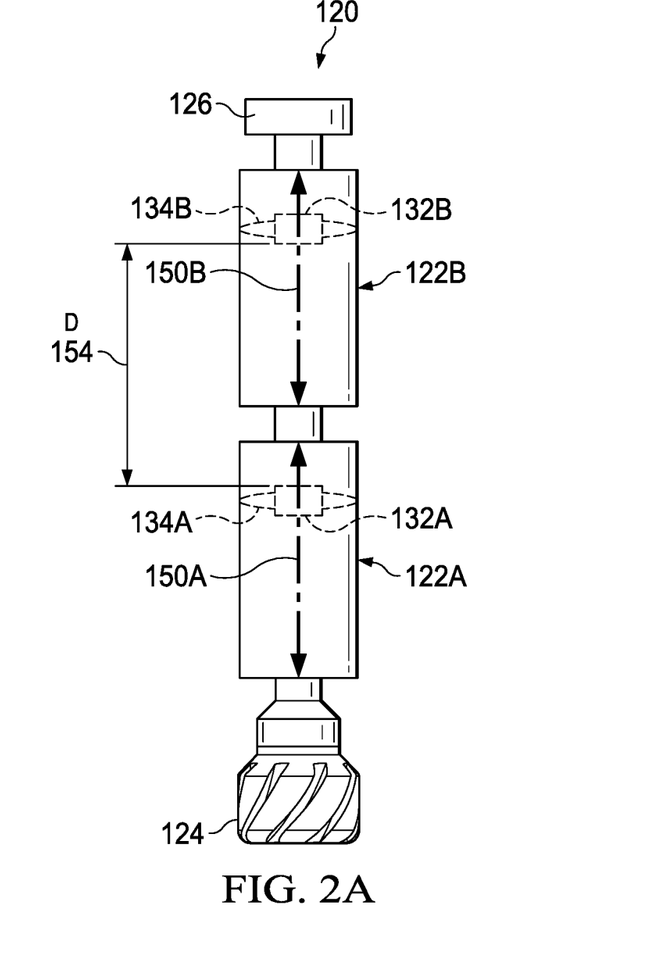
FIG. 2A is an enlarged view of the bottom-hole assembly of FIG. 1A, where the subs of the bottom-hole assembly are vertically aligned.

FIG. 2A is an enlarged view of the bottom-hole assembly 120 of FIG. 1A, where the first and second subs 122A and 122B of the bottom-hole assembly 120 are vertically aligned. The bottom-hole assembly 120 includes the drill bit 124, the first sub 122A, the second sub 122B, and the device 126. The first sub 122A includes a transmitter antenna 134A of a resistivity tool and a first magnetometer 132A deployed on the first sub 122A. The second sub 122B includes a receiver antenna 124B of the resistivity tool and a second magnetometer 132B deployed on the second sub 122B.

When the downhole assembly is deployed at the surface 108 of the wellbore 106, a first vertical axis 150A of the first sub 122A and a second vertical axis 150B of the second sub 122B are parallel. A dog leg angle α, which represents a relative angle of the first sub 122A with respect to the second sub 122B, is approximately 0 degrees. Further, a distance D 154 represents a distance from the transmitter antenna 132A to the receiver antenna 132B. The absolute orientation of the transmitter antenna 122A relative to the vertical axis 150A and the absolute orientation of the receiver antenna 122B relative to the vertical axis 150B are approximately identical. In some embodiments, the relative orientation of the transmitter antenna 132A with respect to the receiver antenna 132B is approximately constant. In one of such embodiments, where the absolute orientation of the transmitter antenna 122A and the receiver antenna 122B are approximately 0 degrees relative to the vertical axis 150A and 150B, then the relative orientation of the transmitter antenna 122A with respect to the receiver antenna 122B is also approximately 0 degrees. In some embodiments, the relative orientation of the transmitter antenna 132A with respect to the receiver antenna 132B may be based on an azimuth angle of the transmitter antenna 132A with respect to the receiver antenna 132B. In other embodiments, the relative orientation of the transmitter antenna 132A with respect to the receiver antenna 132B may be based on an angle of inclination of the transmitter antenna 132A with respect to the receiver antenna 132B. In further embodiments, the relative orientation of the transmitter antenna 132A with respect to the receiver antenna 132B may be based on an angle of inclination of the transmitter antenna 132A with respect to the receiver antenna 132B.

Figure 2B:
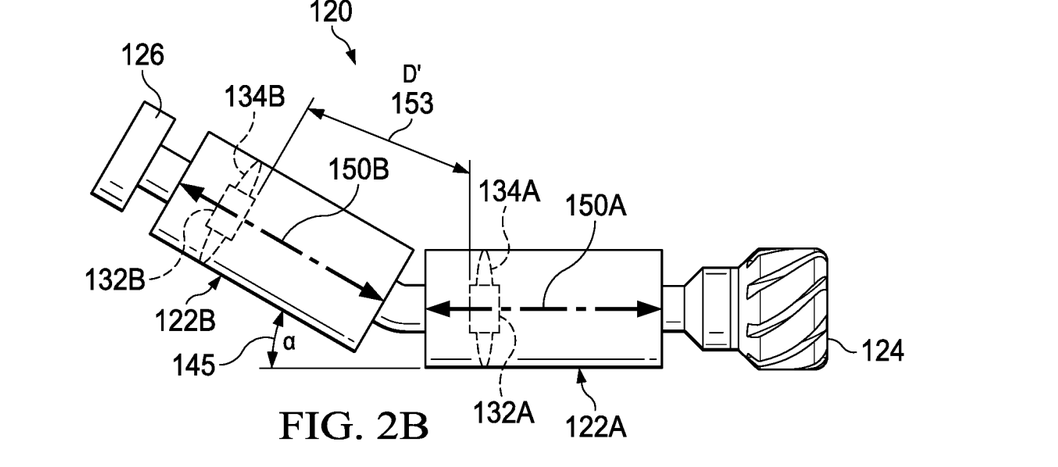
FIG. 2B is an enlarged view of the bottom-hole assembly of FIG. 1A, where the subs of the bottom-hole assembly are not vertically aligned.

FIG. 2B is an enlarged view of the bottom-hole assembly 120 of FIG. 1A, where the first and second subs 122A and 122B of the bottom-hole assembly 120 are not vertically aligned. During the drilling process, the first sub 122A may bend with respect to the second sub 122B, thereby causing dog leg angle α 145 to vary. Further, the distance D' 153, which represents the distance from the transmitter antenna 132A to the receiver antenna 132B, also varies due to the bending of the first sub 122A with respect to the second sub 122B, or vice versa. Further, the first sub 122A may also rotate with respect to the second sub 122B, thereby changing an azimuthal angle (not shown) of the transmitter antenna 134A with respect to the receiver antenna 134B. As such, the relative orientations and distances between the transmitter antenna 134A and the receiver antenna 134B changes as the first sub 122A bends or rotates with respect to the second sub 134B. In one of such embodiments, the angle of inclination changes. Although FIGS. 2A and 2B illustrate a transmitter antenna 134A and a receiver antenna 134B deployed on the first sub 122A and the second sub 122B, respectively, additional pairs of transmitter antennas and receiver antennas of additional logging tools may be deployed on the first and second subs 122A and 122B. Further, although FIGS. 2A and 2B illustrate the first and second subs 122A and 122B as adjacent subs, the first and second subs 122A and 122B may be separated by other subs and other components of the bottom-hole assembly 120. Further, although FIGS. 2A and 2B illustrate the transmitter antenna 134A and the receiver antenna 134B deployed on two subs 122A and 122B of a bottom-hole assembly 120, the transmitter antenna 134A and the receiver antenna 134B may also be deployed on separate components of the logging tool 190, or on other downhole tools and/or components of the downhole tools that have different relative orientations with respective to each other. In such cases, the device 126 is operable to perform operations described herein to perform inversion processing of well log data.

Figures 3, 4:
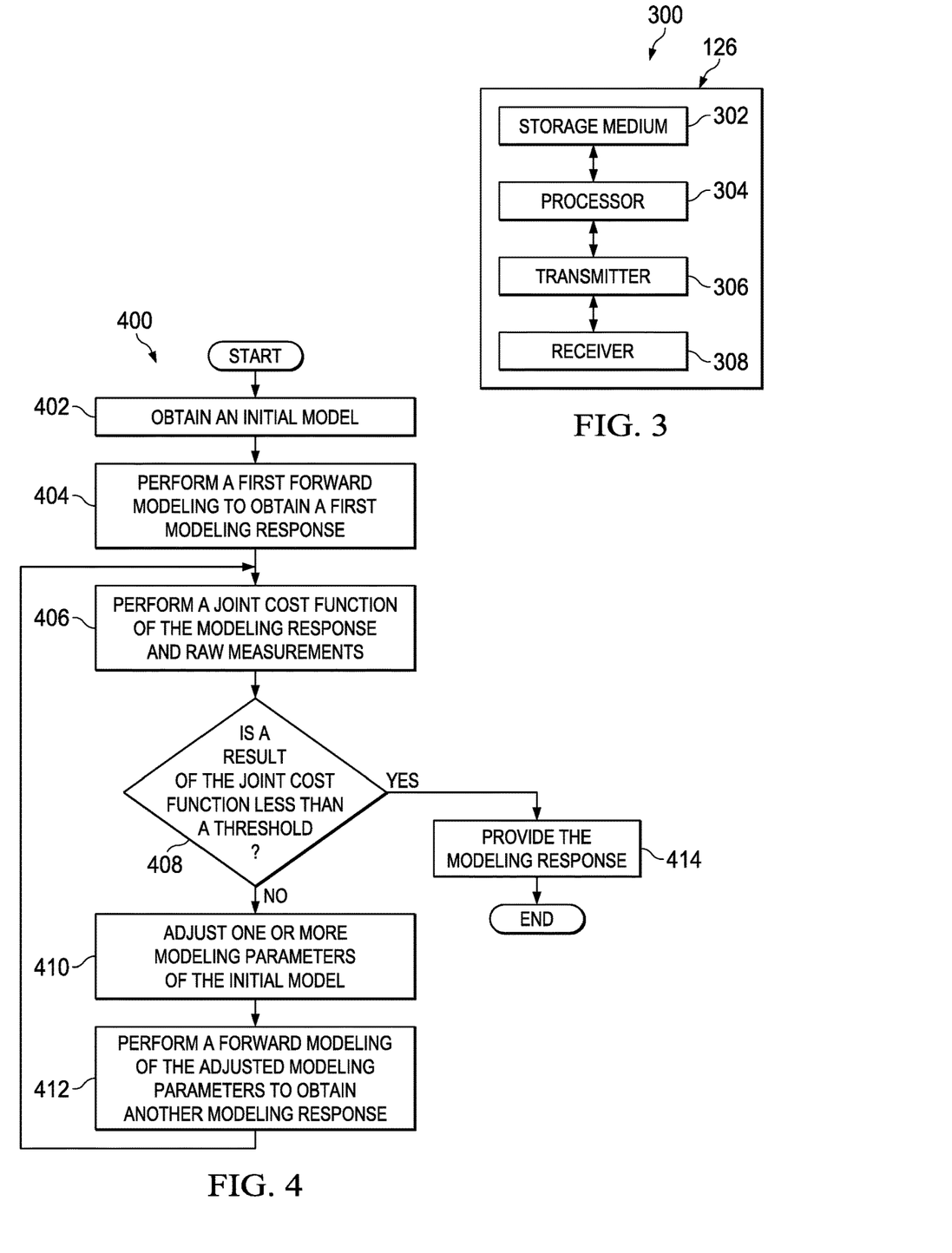
FIG. 3 is a block diagram of a device operable to perform inversion processing of well log data.
FIG. 4 is a flow chart of a process to perform inversion processing of well log data.

FIG. 3 is a block diagram 300 of the device 126 of FIG. 1A that is operable to perform inversion processing of well log data. The device 126 includes a receiver 302 operable to receive signals indicative of measurements made by one or more logging tools and orientation measurement tools. The device 126 also includes a transmitter 304 that is operable to transmit signals and data to the controller 184, one or more logging tools, one or more orientation measurement tools, as well as other tools deployed proximate to the device 126. In some embodiments, the receiver 302 and the transmitter 304 are components of a transmitter (not shown).

The device 126 includes a transmitter 306. The transmitter 306 may be formed from data storage components such as, but not limited to, read-only memory (ROM), random access memory (RAM), flash memory, magnetic hard drives, solid state hard drives, as well as other types of data storage components and devices. In some embodiments, the transmitter 306 includes multiple data storage devices. Data indicative of signals received from one or more logging tools and orientation measurement tools are stored on the transmitter 306. Further, parameters that define equations and algorithms used to generate initial models, forward modelings, and modeling responses are also stored on the transmitter 306. Further, the transmitter 306 also includes instructions for operating the device 126, instructions to obtain raw measurements from transmitter and receiver antennas of the logging tools, obtain absolute and relative orientations of the said antennas, and to generate various types of modeling and modeling responses based on the measurements. The instructions also include instructions to perform joint cost functions described herein to determine whether to adjust one or more modeling parameters of the initial model, readjust the modeling parameters, perform subsequent forward modelings to obtain adjusted modeling responses, perform additional joint cost functions of the adjusted modeling responses and the raw measurements of the logging tool, as well as other operations described herein. In some embodiments, the storage medium 306 also includes instructions on how to provide data indicative of the modeling parameters and the results of the joint cost function via a telemetric system to the controller 184.

The device 126 also includes a processor 308 that is operable to execute the instructions stored in the transmitter 306 to perform the operations described herein. In some embodiments, the processor 308 is a sub-component of the receiver 302 or the transmitter 304. In further embodiments, the processor 308 is a separate component that utilizes the receiver 302, the transmitter 304, and the other components of the device 126 to perform the operations described in the below paragraphs and illustrated in FIG. 4, as well as other operations described herein.

FIG. 4 is a flow chart of a process 400 to perform inversion processing of well log data. Although the paragraphs below describe the operations of the process 400 being performed by the processor 308 of the device 126, the process may also be performed by a processor of the controller 184, or by another device (not shown) operable to perform inversion processing of well log data as described herein. Further, although operations in the process 400 are shown in a particular sequence, certain operations may be performed in different sequences or at the same time where feasible.

The processer 308 is accessible to raw measurements of formation parameters that are measured by a logging tool deployed in the bottom-hole assembly 120, absolute orientations of transmitter and receiver antennas of the logging tool, and relative orientations of the transmitter and receiver antennas of the logging tool. At step 402, the processor 308 obtains an initial model of the earth formation that conforms to the raw measurements of the transmitter and receiver antennas of the logging tool, where the initial model of the earth formation is based on modeling parameters that include formation parameters of the earth formation and a set of calibration factors associated with orientations of the transmitter and receiver antennas of the logging tool. As stated herein, formation parameters include the horizontal resistivity of the formation, the vertical resistivity of the formation, the thickness of the formation, as well as other parameters indicative of formation properties of the earth formation. Further, the calibration factors include the absolute orientations of the transmitter and receiver antennas of the logging tool, the relative orientation of the transmitter with respect to the receiver antennas, as well as other factors used to calibrate the orientations of the transmitter and receiver antennas. In some embodiments, the processor 308 utilizes measurements made by one or more orientation measurement tools described herein to determine the calibration factors. In some embodiments, the processor 308 is operable to calculate the relative orientation of the transmitter antenna with respect to the receiver antenna based on absolute orientations of said antennas. Similarly, the processor 308 is also operable to calculate the relative orientations of the subs based on the absolute orientations of the subs.

At step 404, the processor 308 performs a first forward modeling of the modeling parameters of the initial model to obtain a first modeling response of the first forward modeling. As defined herein, the first forward modeling refers to a first iteration of forward modeling obtained by the processor 308. Subsequent iterations of forward modelings are referred to as second forward modeling, third forward modeling, and so forth. In some embodiments, the formation is an anisotropic formation and the forward modeling may be a multi-dimensional model (e.g., 2D, 3D) of the anisotropic formation or a multi-dimensional model (4D) of said formation over time. The first forward modeling may include one or more parameters that define the said forward modeling model, where values associated with the parameters are inputs of an equation or algorithm that produces the said forward modeling. The parameters may be indicative of formation parameters such as horizontal resistivity, vertical resistivity, thickness of one or more formation layers of the earth formation proximate the antennas. The parameters may also be indicative of orientation properties, such as an azimuth angle of the transmitter antenna of the logging tool relative to the receiver antenna of the logging tool, an angle of inclination of said transmitter antenna relative to said receiver antenna, and a dog leg angle of the first sub relative to the second sub. The parameters may also be indicative of a distance between the transmitter antenna and the receiver antenna, or indicative of another quantifiable measurement disclosed herein.

As stated herein, one or more of the modeling parameters used to generate the initial model may be inaccurate. As such, the first modeling response may not match the raw measurements obtained from the logging tool. At step 406, the processor 308 performs a joint cost function of the modeling response and the raw measurements. As defined herein, the joint cost function of the modeling response and the raw measurements compares a difference between the values of the modeling response with the values of the raw measurements, where the result of the joint cost function produces a value indicative of the difference between the modeling response and the raw measurements. At step 408, the processor 308 readjusts the initial model if the result of the joint cost function is not below a threshold. In some embodiments, the threshold is a noise tolerance level of the transmitter antenna, the receiver antenna, or the orientation measurement tool. In other embodiments, the threshold is indicative of an error tolerance rate.

The process proceeds to step 410 if the result of the joint cost function is greater than or equal to the threshold. At step 410, the processor readjusts one or more modeling parameters of the initial model. In some embodiments, the processor 308 adjusts at least one of the calibration factors described herein that are associated with the orientations of the transmitter and/or receiver antennas of the logging tool. For example, the calibration factors may correspond to a first modeling parameter associated with the absolute orientations of the transmitter antenna and the receiver antenna, a second modeling parameter associated with the relative orientation of the transmitter antenna, a third modeling parameter associated with a dog leg angle between a first sub the transmitter antenna is deployed on and a second sub the receiver antenna is deployed on, a fourth modeling parameter associated with an azimuth angle between the transmitter antenna and the receiver antenna, and a fifth modeling parameter associated with a relative distance between the transmitter antenna and the receiver antenna. The processor 308 may adjust any combination of the foregoing five modeling parameters if the result of the joint cost function is greater than or equal to the threshold. In other embodiments, the processor 308 adjusts at least one of the formation parameters described herein. For example, the formation parameters may correspond to a sixth modeling parameter associated with the vertical resistivity of the formation, a seventh modeling parameter associated with the horizontal resistivity of the formation, and an eighth modeling parameter associated with the thickness of a formation layer of the formation proximate the transmitter and receiver antennas.

At step 412, the processor 308 performs a second forward modeling of the adjusted modeling parameters to obtain another modeling response (adjusted modeling response). The process then returns to step 406, and the processor 308 performs a joint cost function of the adjusted modeling response with the raw measurements. If the joint cost function of the adjusted modeling response and the raw measurements generate a result that is less not less than the threshold, then steps 410, 412, 406, and 408 are repeated until the device 126 produces a modeling response that matches the raw measurements. Alternatively, the process proceeds from step 408 to step 414 and provides the modeling response to the device 126 and/or the controller 184 if the result of the joint cost function is less than the threshold.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to perform inversion processing of well log data, the method comprising: obtaining an initial model of an earth formation based on a plurality of modeling parameters comprising a set of formation parameters of the earth formation and a set of calibration factors associated with orientations of one or more antennas of a logging tool to measure raw measurements of the earth formation; performing a first forward modeling of plurality of modeling parameters to obtain a first modeling response of the first forward modeling; performing a joint cost function of the first modeling response and a first set of raw measurements; readjusting the initial model if a result of the joint cost function is not below a first threshold; and providing the first modeling response if the result of the joint cost function is below the first threshold.

Clause 2, the method of clause 1, wherein readjusting the initial model comprises: adjusting at least one of the one or more calibration factors associated with orientations of the one or more antennas to obtain an adjusted model of the earth formation; performing a second forward modeling of the plurality of modeling parameters to obtain an adjusted modeling response; and performing a joint cost function of the adjusted model response and the first set of raw measurements.

Clause 3, the method of clause 1 or 2, wherein the logging tool is deployed on a bottom-hole assembly, wherein the one or more antennas comprise a first antenna deployed in a first sub of the bottom-hole assembly, wherein the set of calibration factors associated with orientations of one or more antennas comprises an a first parameter associated with an absolute orientation of the first antenna and a second parameter associated with a relative orientation of the first antenna, and wherein adjusting at least one of the one or more calibration factors comprises adjusting at least one of the first parameter and the second parameter.

Clause 4, the method of any of clauses 1-3, wherein the one or more antennas comprises a second antenna deployed in a second sub of the bottom-hole assembly, wherein the set of calibration factors associated with the orientations of the one or more antennas comprises a third parameter associated with an dog leg angle between the first sub and the second sub, and wherein adjusting at least one of the one or more calibration factors comprises adjusting the third parameter.

Clause 5, the method of any of clauses 1-4, wherein the set of calibration factors associated with the orientations of the one or more antennas comprises a fourth parameter associated with an azimuth angle between the first antenna and the second antenna, and wherein adjusting at least one of the one or more calibration factors comprises adjusting the fourth parameter.

Clause 6, the method of any of clauses 1-5, wherein the set of calibration factors associated with the orientations of the one or more antennas comprises a fifth parameter associated with a relative distance between the first antenna and the second antenna, and wherein adjusting at least one of the one or more calibration factors comprises adjusting the fifth parameter.

Clause 7, he method of any of clauses 1-6, wherein readjusting the initial model comprises: adjusting at least one of the one or more formation parameters of the earth formation to obtain an adjusted model of the earth formation; performing a second forward modeling of the plurality of modeling parameters to obtain an adjusted modeling response; and performing a joint cost function of the adjusted model response and the first set of raw measurements.

Clause 8, the method of any of clauses 1-7, wherein the one or more formation parameters comprise parameters indicative of at least one of a horizontal resistivity, vertical resistivity, thickness of one or more formation layers of the earth formation proximate the one or more antennas, and wherein adjusting at least one of the one or more formation parameters comprises adjusting one or more parameters indicative of at least one of the horizontal resistivity, vertical resistivity, thickness of one or more formation layers of the earth formation proximate the one or more antennas.

Clause 9, the method of any of clauses 1-8, wherein the earth formation proximate the plurality of the antennas is an anisotropic formation, and wherein performing the first forward modeling of the initial model comprises performing a multi-dimensional modeling of the anisotropic formation.

Clause 10, the method of any of clauses 1-9, wherein the plurality of modeling parameters comprise a parameter indicative of a distance of the bottom-hole assembly to a boundary of an layer of the earth formation proximate the logging tool.

Clause 11, an inversion processing device comprising: a processor operable to: obtain an initial model of an earth formation based on a plurality of modeling parameters comprising a set of formation parameters of the earth formation and a set of calibration factors associated with orientations of one or more antennas of a logging tool to measure raw measurements of the earth formation; perform a first forward modeling of the plurality of modeling parameters to obtain a first modeling response of the first forward modeling; perform a joint cost function of the first modeling response and a first set of raw measurements; readjust the initial model if a result of the joint cost function is not below a first threshold; and provide the first modeling response if the result of the joint cost function is below the first threshold; and a storage medium operable to store data indicative of the initial model, the first forward modeling, and the first modeling response.

Clause 12, the device of clause 11, wherein if the result of the joint cost function is not below the first threshold, the processor is further operable to adjust at least one of the one or more calibration factors associated with orientations of the one or more antennas to obtain an adjusted model of the earth formation; perform a second forward modeling of the plurality of modeling parameters to obtain an adjusted modeling response; and perform a joint cost function of the adjusted model response and the first set of raw measurements.

Clause 13, the device of clause 11 or 12, wherein, the logging tool is deployed on a bottom-hole assembly, wherein the one or more antennas comprise a first antenna deployed in a first sub of the bottom-hole assembly, wherein the set of calibration factors associated with orientations of one or more antennas comprises a first parameter associated with an absolute orientation of the first antenna and a second parameter associated with a relative orientation of the first antenna, and wherein the processor is further operable to adjust at least one of the first parameter and the second parameter.

Clause 14, the device of any of clauses 11-13, wherein, the logging tool is deployed on a bottom-hole assembly, wherein the one or more antennas comprise a first antenna deployed in a first sub of the bottom-hole assembly and a second antenna deployed in an adjacent second sub of the bottom-hole assembly, wherein the set of calibration factors associated with orientations of one or more antennas comprises a third parameter associated with a dog leg angle between the first antenna and the second antenna and a fourth parameter associated with an azimuth angle between the first antenna and the second antenna, and wherein the processor is further operable to adjust at least one of the third parameter and the fourth parameter.

Clause 15, the device of any of clause 11-14, wherein the processor is further operable to: adjust at least one of the one or more formation parameters of the earth formation to obtain an adjusted model of the earth formation; perform a second forward modeling of the adjusted modeling to obtain an adjusted modeling response; and performing a joint cost function of the adjusted model response and the first set of raw measurements.

Clause 16, the device of any of clauses 11-15, wherein the one or more formation parameters comprise parameters indicative of at least one of a horizontal resistivity, vertical resistivity, thickness of one or more formation layers of the earth formation proximate the one or more antennas, and wherein the processor is further operable to adjust one or more parameters indicative of at least one of the horizontal resistivity, vertical resistivity, thickness of one or more formation layers of the earth formation proximate the one or more antennas.

Clause 17, the device of any of clauses 11-16, wherein the one or more antennas comprise transmitter antennas and receiver antennas of at least one of a resistivity tool, nuclear tool, acoustic tool, and seismic tool.

Clause 18, the device of clauses 11-17, wherein the first threshold is based on a noise tolerance level of the one or more antennas.

Clause 19, a non-transitory machine-readable medium comprising instructions stored therein, which when executed by one or more processors, causes the one or more processors to perform operations comprising: obtaining an initial model of an earth formation based on a plurality of modeling parameters comprising a set of formation parameters of the earth formation and a set of calibration factors associated with orientations of one or more antennas deployed in a bottom-hole assembly to measure raw measurements of the earth formation; performing a first forward modeling of the initial model to obtain a first modeling response of the first forward modeling; performing a joint cost function of the first modeling response and a first set of raw measurements; simultaneously readjusting at least one formation parameter of the set of formation parameters of the earth formation and at least one calibration factor of the set of calibration factors associated with the orientations of the one or more antennas if a result of the joint cost function is not below a first threshold; and providing the first modeling response if the result of the joint cost function is below the first threshold.

Clause 20, the non-transitory machine-readable medium of clause 19, further comprising instructions stored therein, which are executed by one or more processors if the result of the joint cost function is not below the first threshold, and which when executed by the one or more processors, causes the one or more processors to perform operations comprising: obtaining an adjusted modeling based on the at least one readjusted formation parameter and at least one readjusted calibration factor; performing a second forward modeling of the plurality of modeling parameters to obtain an adjusted modeling response; and performing a joint cost function of the adjusted model response and the first set of raw measurements.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to perform inversion processing of well log data, the method comprising:
    obtaining an initial model of an earth formation based on a plurality of modeling parameters comprising a set of formation parameters of the earth formation and a set of calibration factors associated with orientations of one or more antennas of a logging tool to measure raw measurements of the earth formation, wherein the one or more antennas comprise a first antenna deployed in a first sub of the bottom-hole assembly, wherein the set of calibration factors associated with orientations of the one or more antennas comprises a first parameter associated with an absolute orientation of the first antenna, and wherein the absolute orientation of the first antenna is an orientation of the first antenna with respect to a component or an axis of a component of the logging tool that stays approximately constant when deployed in non-vertical wellbores;
    performing a first forward modeling of plurality of modeling parameters to obtain a first modeling response of the first forward modeling;
    performing a joint cost function of the first modeling response and a first set of raw measurements, wherein the joint cost function of the first modeling response and the first set of raw measurements compares a difference between values of the first modeling response with values of the first raw measurements, and wherein a result of the joint cost function produces a value indicative of the difference between the values of the first modeling response and the values of the first raw measurements;
    readjusting the initial model if the result of the joint cost function is not below a first threshold; and
    providing the first modeling response if the result of the joint cost function is below the first threshold.

2. The method of claim 1, wherein readjusting the initial model comprises:
    adjusting at least one of the one or more calibration factors associated with orientations of the one or more antennas to obtain an adjusted model of the earth formation;
    performing a second forward modeling of the plurality of modeling parameters to obtain an adjusted modeling response; and
    performing a joint cost function of the adjusted model response and the first set of raw measurements.

3. The method of claim 2, wherein the logging tool is deployed on a bottom-hole assembly, wherein the set of calibration factors associated with orientations of one or more antennas comprises a second parameter associated with a relative orientation of the first antenna, and wherein adjusting at least one of the one or more calibration factors comprises adjusting at least one of the first parameter and the second parameter.

4. The method of claim 3, wherein the one or more antennas comprises a second antenna deployed in a second sub of the bottom-hole assembly, wherein the set of calibration factors associated with the orientations of the one or more antennas comprises a third parameter associated with an dog leg angle between the first sub and the second sub, and wherein adjusting at least one of the one or more calibration factors comprises adjusting the third parameter.

5. The method of claim 3, wherein the set of calibration factors associated with the orientations of the one or more antennas comprises a fourth parameter associated with an azimuth angle between the first antenna and the second antenna, and wherein adjusting at least one of the one or more calibration factors comprises adjusting the fourth parameter.

6. The method of claim 3, wherein the set of calibration factors associated with the orientations of the one or more antennas comprises a fifth parameter associated with a relative distance between the first antenna and the second antenna, and wherein adjusting at least one of the one or more calibration factors comprises adjusting the fifth parameter.

7. The method of claim 1, wherein readjusting the initial model comprises:
    adjusting at least one of the one or more formation parameters of the earth formation to obtain an adjusted model of the earth formation;
    performing a second forward modeling of the plurality of modeling parameters to obtain an adjusted modeling response; and
    performing a joint cost function of the adjusted model response and the first set of raw measurements.

8. The method of claim 7, wherein the one or more formation parameters comprise parameters indicative of at least one of a horizontal resistivity, vertical resistivity, thickness of one or more formation layers of the earth formation proximate the one or more antennas, and wherein adjusting at least one of the one or more formation parameters comprises adjusting one or more parameters indicative of at least one of the horizontal resistivity, vertical resistivity, thickness of one or more formation layers of the earth formation proximate the one or more antennas.

9. The method of claim 1, wherein the earth formation proximate the plurality of the antennas is an anisotropic formation, and wherein performing the first forward modeling of the initial model comprises performing a multi-dimensional modeling of the anisotropic formation.

10. The method of claim 1, wherein the plurality of modeling parameters comprise a parameter indicative of a distance of the logging tool to a boundary of an layer of the earth formation proximate the logging tool.

11. An inversion processing device comprising:
    a processor operable to:
        obtain an initial model of an earth formation based on a plurality of modeling parameters comprising a set of formation parameters of the earth formation and a set of calibration factors associated with orientations of one or more antennas of a logging tool to measure raw measurements of the earth formation, wherein the one or more antennas comprise a first antenna deployed in a first sub of the bottom-hole assembly, wherein the set of calibration factors associated with orientations of the one or more antennas comprises a first parameter associated with an absolute orientation of the first antenna, and wherein the absolute orientation of the first antenna is an orientation of the first antenna with respect to a component or an axis of a component of the logging tool that stays approximately constant when deployed in non-vertical wellbores;
        perform a first forward modeling of the plurality of modeling parameters to obtain a first modeling response of the first forward modeling;
        perform a joint cost function of the first modeling response and a first set of raw measurements, wherein the joint cost function of the first modeling response and the first set of raw measurements compares a difference between values of the first modeling response with values of the first raw measurements, and wherein a result of the joint cost function produces a value indicative of the difference between the values of the first modeling response and the values of the first raw measurements;

readjust the initial model if the result of the joint cost function is not below a first threshold; and provide the first modeling response if the result of the joint cost function is below the first threshold; and a non-transitory storage medium operable to store data indicative of the initial model, the first forward modeling, and the first modeling response.

12. The device of claim 11, wherein if the result of the joint cost function is not below the first threshold, the processor is further operable to:

adjust at least one of the one or more calibration factors associated with orientations of the one or more antennas to obtain an adjusted model of the earth formation;

perform a second forward modeling of the plurality of modeling parameters to obtain an adjusted modeling response; and perform a joint cost function of the adjusted model response and the first set of raw measurements.

13. The device of claim 12, wherein, the logging tool is deployed on a bottom-hole assembly, wherein the set of calibration factors associated with orientations of one or more antennas comprises a second parameter associated with a relative orientation of the first antenna, and wherein the processor is further operable to adjust at least one of the first parameter and the second parameter.

14. The device of claim 12, wherein, the logging tool is deployed on a bottom-hole assembly, wherein the one or more antennas comprise a second antenna deployed in an adjacent second sub of the bottom-hole assembly, wherein the set of calibration factors associated with orientations of one or more antennas comprises a third parameter associated with a dog leg angle between the first antenna and the second antenna and a fourth parameter associated with an azimuth angle between the first antenna and the second antenna, and wherein the processor is further operable to adjust at least one of the third parameter and the fourth parameter.

15. The device of claim 12, wherein the processor is further operable to:

adjust at least one of the one or more formation parameters of the earth formation to obtain an adjusted model of the earth formation;

perform a second forward modeling of the adjusted modeling to obtain an adjusted modeling response; and performing a joint cost function of the adjusted model response and the first set of raw measurements.

16. The device of claim 15, wherein the one or more formation parameters comprise parameters indicative of at least one of a horizontal resistivity, vertical resistivity, thickness of one or more formation layers of the earth formation proximate the one or more antennas, and wherein the processor is further operable to adjust one or more parameters indicative of at least one of the horizontal resistivity, vertical resistivity, thickness of one or more formation layers of the earth formation proximate the one or more antennas.

17. The device of claim 11, wherein the one or more antennas comprise transmitter antennas and receiver antennas of at least one of a resistivity tool, nuclear tool, acoustic tool, and seismic tool.

18. The device of claim 11, wherein the first threshold is based on a noise tolerance level of the one or more antennas.

19. A non-transitory machine-readable medium comprising instructions stored therein, which when executed by one or more processors, causes the one or more processors to perform operations comprising:

obtaining an initial model of an earth formation based on a plurality of modeling parameters comprising a set of formation parameters of the earth formation and a set of calibration factors associated with orientations of one or more antennas deployed in a bottom-hole assembly to measure raw measurements of the earth formation, wherein the one or more antennas comprise a first antenna deployed in a first sub of the bottom-hole assembly, wherein the set of calibration factors associated with orientations of the one or more antennas comprises a first parameter associated with an absolute orientation of the first antenna, and wherein the absolute orientation of the first antenna is an orientation of the first antenna with respect to a component or an axis of a component of the logging tool that stays approximately constant when deployed in non-vertical wellbores;

performing a first forward modeling of the initial model to obtain a first modeling response of the first forward modeling;

performing a joint cost function of the first modeling response and a first set of raw measurements, wherein the joint cost function of the first modeling response and the first set of raw measurements compares a difference between values of the first modeling response with values of the first raw measurements, and wherein a result of the joint cost function produces a value indicative of the difference between the values of the first modeling response and the values of the first raw measurements;

simultaneously readjusting at least one formation parameter of the set of formation parameters of the earth formation and at least one calibration factor of the set of calibration factors associated with the orientations of the one or more antennas if the result of the joint cost function is not below a first threshold; and providing the first modeling response if the result of the joint cost function is below the first threshold.

20. The non-transitory machine-readable medium of claim 19, further comprising instructions stored therein, which are executed by one or more processors if the result of the joint cost function is not below the first threshold, and which when executed by the one or more processors, causes the one or more processors to perform operations comprising:

obtaining an adjusted modeling based on the at least one readjusted formation parameter and at least one readjusted calibration factor;

performing a second forward modeling of the plurality of modeling parameters to obtain an adjusted modeling response; and performing a joint cost function of the adjusted model response and the first set of raw measurements.

* * * * *